Aug. 29, 1933. O. SPRING 1,924,575
PROCESS OF MAKING ORGANIC ESTERS
Filed Aug. 4, 1930
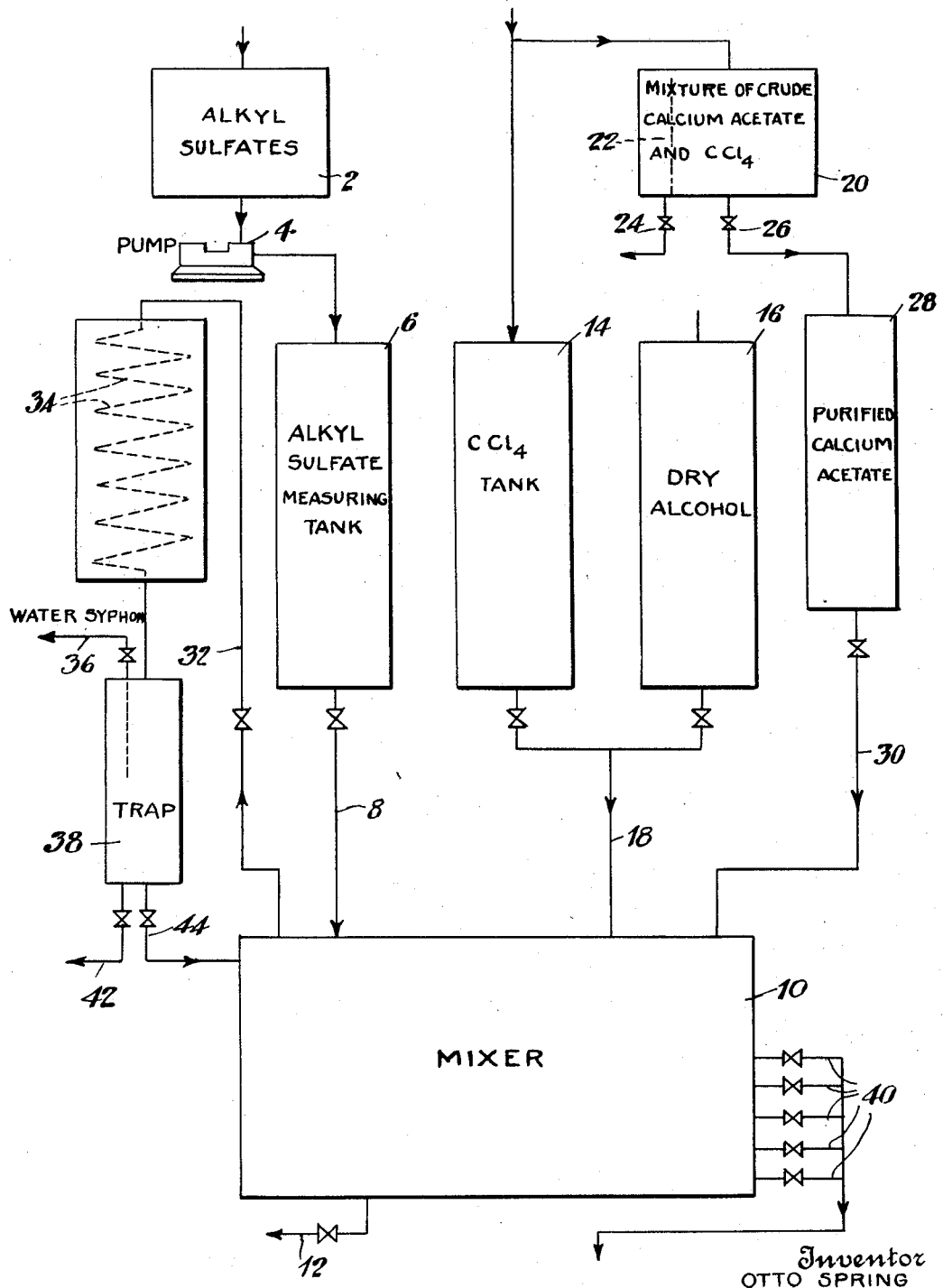
Inventor
OTTO SPRING
By his Attorney
Edmund G. Borden Patented Aug. 29, 1933

1,924,575

UNITED STATES PATENT OFFICE 1,924,575

PROCESS OF MAKING ORGANIC ESTERS

Otto Spring, Okmulgee, Okla., assignor to Doherty Research Company, New York, N. Y., a corporation of Delaware Application August 4, 1930. Serial No. 473,035

14 Claims. (Cl. 260—106)

This invention relates to a process and apparatus for the manufacture of organic esters. The invention is an improvement on the invention of the application Serial No. 284,347 filed by Otto Spring and Sylvan R. Merley on June 11, 1928, disclosing a process in which hydrocarbon oil is used as a dispersive medium for the calcium salt of an organic acid such as calcium acetate, and alkyl sulfates for the direct production of organic esters and also as a solvent for the esters formed. The invention is also an improvement on the processes disclosed in the Ellis and Cohen Patents No. 1,365,050 and No. 1,365,051.

It has been discovered that carbon tetrachloride when used in the preparation of organic esters from alkyl sulfates acts as an efficient medium for properly dispersing a salt of an organic acid through the mixture of the saturated sulfates. It has also been found that carbon tetrachloride acts as a proper means on account of its high solvent power for the clean cut separation of the resultant esters formed at the end of the reaction between the organic salt and the alkyl sulfates. Furthermore carbon tetrachloride has been found to increase the fluidity of a mixture of alkyl sulfates and calcium acetate.

An object of this invention is to use carbon tetrachloride as a dispersive medium in the chemical reaction between an alkyl sulfate and the salt of an organic acid.

Another object of this invention is to use carbon tetrachloride because of its non-inflammable properties as a solvent of the liquid portions obtained by esterifying the alkyl sulfates with a salt of an organic acid such as calcium acetate, thereby converting otherwise highly inflammable liquids into non-inflammable mixtures.

A further object of this invention is to extract any tarry or resinous material present in crude commercial anhydrous salts of organic acids, such as calcium acetate, by treating these salts with carbon tetrachloride under the proper conditions to dissolve out such tarry or resinous substances.

Another object of this invention is to use a purified anhydrous salt of an organic acid for esterifying alkyl sulfates, thereby precluding the contamination of such esters by any tarry or resinous substances usually present in such salts.

The invention may be described in detail by reference to the attached figure which represents a flow sheet of the process showing diagrammatically an apparatus adapted for carrying out such process. In accordance with the invention, alkyl esters of an inorganic acid preferably of concentrated sulfuric acid are decanted or pumped from a settling tank 2, by means of pump 4 into a measuring tank 6, and from this measuring tank a definite volume of alkyl sulfate solution is passed into an esterification mixer 10 through a valved conduit 8. The esterification mixer is a closed steam jacketed reaction vessel provided with mixing blades adapted for thoroughly mixing viscous or semi-viscous materials. After a definite volume of alkyl sulfates is added to the mixer about one-fifth its volume of carbon tetrachloride is added from a tank 14 through a valve controlled conduit 18. The mixer of alkyl sulfates and carbon tetrachloride is thoroughly agitated, care being taken to maintain the temperature of this mixture below 122° F. to prevent the evaporation of any carbon tetrachloride. By thus agitating the mixture, the carbon tetrachloride thoroughly disperses the alkyl sulfates. During this agitation an anhydrous tar-free salt of an organic acid, preferably calcium acetate and other higher tar free salts such as calcium propionate depending upon the kind of esters desired, is slowly added from container 28 through conduit 30 to the mixture in 10. In the use of crude salts of organic acids, such as commercial calcium acetate, for manufacturing esters, much difficulty has been encountered on account of the resinous and tarry impurities present therein which contaminate any resultant esters formed. To remove any tarry and resinous material present in the crude calcium acetate or higher salts a mixture of the crude calcium acetate and hot carbon tetrachloride is placed in tank 20 and thoroughly agitated for about half an hour, at the end of which time the carbon tetrachloride dissolves out any tarry or resinous substances present in the acetate. The carbon tetrachloride containing the tarry or resinous materials in solution is strained through filtering cloth 22 and drained through valve 24. The calcium acetate remaining in 20 is ready for use by flowing it through a valve controlled conduit 26 into reserve tank 28. The carbon tetrachloride used in the extraction of tar or resinous materials from the crude calcium acetate may be purified by distillation and used again as a solvent for other batches of crude calcium acetate, or it may be used in mixer 10. The proportion of the calcium acetate used in the process is about 80% of the sulfuric acid equivalent of the alkyl sulfate solution. This amount of calcium acetate is added to insure complete esterification of the alkyl sulfates in the mixture. At this point the carbon tetrachloride in the mixture besides acting as a dispersive medium for the alkyl sulfates and the calcium acetate also acts as a solvent for the esters formed during the reaction. The calcium acetate is gradually forced from tank 28 through conduit 30 into the mixer 10 where the resultant mixture is thoroughly agitated. The thorough agitation prevents localized increases in temperature due to the chemical reaction between the calcium acetate and alkyl sulfates in any particular portion of the mixture, thereby preventing polymerization of the esters. The temperature of the mixture of alkyl sulfates, carbon tetrachloride and calcium acetate is gradually increased to a temperature between 175° and 195° F. and is maintained at that temperature for about one hour, with refluxing of the vapors formed through conduit 32, into water cooled condenser 34 where the vapors are condensed, then through trap 38 and back into the mixer through conduit 44.

To hasten the reaction between the alkyl sulfates and the calcium acetate, instead of heating at ordinary atmospheric pressure, the mixture in 10 may be heated under pressures varying from one to five atmospheres by closing the valves on the inlet and outlet conduits of the mixer for a definite period of time; however it has been found that heating at ordinary pressure is just as suitable.

During the heat treatment a chemical reaction occurs between the calcium acetate and the alkyl sulfates to produce organic esters corresponding to the alkyl radical of the alkyl sulfate, a precipitate-calcium sulfate and some acetic acid. The reaction may be illustrated by the following equation for the reaction between calcium acetate and isopropyl sulfuric acid:

$$(CH_3COO)_2Ca + C_3H_7HSO_4 \rightarrow CaSO_4 + CH_3COOC_3H_7 + CH_3COOH$$

In order to neutralize excess organic acids formed and to increase the yield of esters an excess of a dry alcohol of 3, 4 or more carbon atoms to molecule, the particular alcohol to be used depending upon the ester desired, is pumped into the esterification mixer from tank 16 following the agitation and heat treatment of the esterification mixture. The amount of alcohol added is equal to the excess organic acids formed plus 15%. This amount not only neutralizes substantially all the acetic acid, but also leaves 15% of free alcohol present in the esters. Another reason why a 15% excess of alcohol is desired is that the trade tolerates such a percentage of alcohols in esters commonly sold on the market. The mixture is again heated for about one hour between 175° and 195° F. to allow for the formation of esters during which time the volatile substances are passed through a vapor conduit 32 into the water cooled condenser 34, condensed and conducted back into the mixer 10 through the trap 38 and valve controlled conduit 44. The trap is so disposed as to retain any water which may come over during the refluxing and as the water collects in the trap it is forced out through a conduit 36. If isopropyl alcohol were used as the dry alcohol, the reaction between that alcohol and the excess acetic acid evolved during the reaction may be represented by the general equation:

$$C_3H_7OH + CH_3COOH \rightarrow CH_3COOC_3H_7 + H_2O$$

When the reaction is complete in the mixer 10, the mixture containing a large quantity of liquid and solids is cooled. The liquid portion contains esters, carbon tetrachloride, alcohols and some acetic acid, whereas the solid portion contains calcium sulfate which was formed during the reaction and absorbed sulfuric acid. The liquid portion may be decanted through draw-off pipes 40 into large settling tanks.

When the liquid portion has been decanted the carbon tetrachloride, because of its constant boiling point, may be distilled off first at about 169° F., whereas in the use of hydrocarbon oils as a dispersive medium, the temperature range varies from 400° to 500° F. This high temperature range of the hydrocarbon oil makes separation of the crude esters more difficult. This boiling point also causes chemical reactions between the sulfuric acid and esters with the formation of polymers which are difficult to extract from the esters.

The subsequent separation of the esters and alcohols from the acetic acid as readily accomplished by fractional distillation.

The solids in the mixer are given several washings with carbon tetrachloride to separate out any traces of acetic acid, esters and alcohols occluded therein. These washings may be distilled over and collected through valve controlled conduit 42 or they may run into crude ester tanks for fractionation. After several washings the solids in the mixer are heated to about 250° F. to remove all volatile constituents, then the solids, remaining as a dry powdery mass, are taken from the mixer through a cleanout 12. The mixer is now ready for another run in which the carbon tetrachloride is again used as a dispersive medium, and also as a solvent for the resultant liquids. Instead of using only one mixer for esterifying the alkyl sulfates in the presence of carbon tetrachloride, a plurality of mixers may be used to allow for economy of time and labor.

Some of the important advantages of using carbon tetrachloride in the preparation of organic esters are:

Carbon tetrachloride is a good solvent in the esterification process and is non-inflammable and makes otherwise very highly inflammable liquids into non-inflammable mixtures.

Carbon tetrachloride as a solvent is recoverable at a low temperature of approximately 169° F., free from polymers and condensed material transferred in the residue after distilling off resultant esters, whereas hydrocarbon oils boil over at from 400° to 600° F. which temperature is conducive to the formation of polymers.

Carbon tetrachloride may be used in the extraction of tar from crude calcium acetate thereby producing a refined form of acetate to manufacture organic esters. It has a definite boiling point instead of a range which makes its complete recovery in a fairly pure state much easier and economical.

Having thus described the invention in its preferred form what is claimed as new is:

1. In the process of making organic esters from a solution of alkyl sulphates by reacting therewith a salt of an organic carboxylic acid, the improvement which comprises mixing the alkyl sulphate solution, carbon tetrachloride and the salt of the organic acid, said salt being present in an amount equal to about 80% of the sulphuric acid equivalent of the alkyl sulphate solution, heating the resulting mixture to a predetermined temperature to insure substantially complete reaction, cooling the said mixture and decanting off the liquid portions thereof.

2. In the process of making organic esters by the interaction of saturated alkyl sulphates with a salt of an organic carboxylic acid, the improvement which comprises mixing carbon tetrachloride with the saturated alkyl sulphates, and then slowly adding the salt of the organic acid thereto, agitating and refluxing the resulting mixture until the reaction is completed, subsequently adding dry alcohols, refluxing, cooling and then decanting the liquid portion from such solids as are formed in the reaction mixture.

3. In the process of making organic esters from alkyl sulphates by reacting therewith a salt of an organic carboxylic acid, the improvement which comprises mixing alkyl sulphates with carbon tetrachloride, a tar-free anhydrous salt of the organic acid and a dry alcohol, agitating and heating the resulting mixture under a superatmospheric pressure and then cooling and decanting the liquid portion of the mixture from the solids formed in the reaction.

4. In the process of manufacturing secondary organic alkyl esters from an inorganic acid saturated with secondary olefins by reacting therewith a calcium salt of an organic carboxylic acid, the improvement which comprises mixing carbon tetrachloride, an anhydrous tar-free calcium salt of an organic acid, and said inorganic acid saturated with secondary olefins, effecting said mixing operation at a temperature below 122° F. and heating the resulting mixture under superatmospheric pressure until the desired reaction is completed.

5. In the process of manufacturing secondary alkyl organic esters from an inorganic acid saturated with secondary olefins by reacting therewith a calcium salt of an organic carboxylic acid, the improvement which comprises adding a substantially anhydrous tar-free calcium salt of an organic acid to a mixture of carbon tetrachloride and said inorganic acid saturated with secondary olefins at a temperature below 122° F., heating the resulting mixture to a temperature of approximately 195° F., at a superatmospheric pressure for a predetermined interval of time to insure substantially complete reaction, subsequently adding to such mixture an excess of dry alcohols sufficient to neutralize any organic acid present and to provide at least 15% of free alcohols in the ester product recovered.

6. The process of manufacturing organic esters, which comprises adding carbon tetrachloride to a saturated mixture of alkyl sulfates, agitating and slowly adding tar-free calcium actate equivalent to substantially 80% of the sulfate present in the mixture, increasing the temperature to a point not exceeding 195° F. after the addition of said acetate whereby an ester is formed, adding a quantity of dry alcohol sufficient to neutralize the excess of organic acids evolved in the reaction between the alkyl sulfate and the calcium acetate and decanting the liquid portion from the solids formed.

7. In the process of manufacturing secondary organic esters from secondary alkyl sulphates by reacting therewith a salt of an organic carboxylic acid, the improvement which comprises mixing the secondary alkyl sulphates with about one fifth its volume of carbon tetrachloride, agitating the resulting mixture and maintaining its temperature at about 122° F. while adding thereto a tar-free anhydrous salt of the organic acid, thereafter gradually raising the temperature to a predetermined point to insure substantially complete reaction, and decanting off the esters formed in the process.

8. In the process of manufacturing organic esters by the interaction of a mixture of alkyl sulphates with a salt of an organic carboxylic acid, the improvement which comprises mixing the alkyl sulphates with carbon tetrachloride, agitating the mixture and maintaining the temperature thereof below 122° F. while adding thereto an anhydrous tar-free salt of the organic acid, thereafter gradually increasing the temperature of the resulting mixture to about 195° F., and subsequently adding a dry alcohol to neutralize any excess organic acid liberated during the carrying out of the reaction.

9. In the process of manufacturing organic esters from alkyl sulphates by reacting therewith a salt of an organic carboxylic acid, the improvement which comprises slowly adding the salt of the organic acid to a mixture of the alkyl sulphates with carbon tetrachloride, agitating and heating the resulting mixture for a predetermined period of time sufficient to cause substantially complete reaction for the formation of said organic esters, and neutralizing any excess organic acid evolved during the process by the addition of dry alcohol to the mixture.

10. In the process of manufacturing organic esters from alkyl sulphates by reacting therewith a salt of an organic carboxylic acid, the improvement which comprises forming a mixture of the alkyl sulphates with carbon tetrachloride, and adding thereto the salt of the organic acid, heating the resulting mixture for a length of time sufficient to insure substantially complete reaction, adding to the reaction mixture a quantity of dry alcohol sufficient to neutralize any excess organic acid evolved in the reaction, and subsequently decanting the resulting crude esters and carbon tetrachloride from the reaction mixture.

11. The process of making organic esters, which comprises mixing an alkyl sulfate solution, carbon tetrachloride and an alkaline earth metal salt of an aliphatic monocarboxylic acid, and heating the resultant mixture to a predetermined temperature to insure substantially complete reaction.

12. The process of making organic esters, which comprises mixing carbon tetrachloride and a substantially anhydrous and tar-free alkaline earth metal salt of an aliphatic monocarboxylic acid with an alkyl sulfate solution at a temperature below about 122° F., and heating the said mixture until reaction is completed.

13. The process of making organic esters, which comprises adding carbon tetrachloride to an alkyl sulfate solution, slowly adding an alkaline earth metal salt of an aliphatic monocarboxylic acid, agitating and heating the resultant mixture until reaction is completed, subsequently adding dry alcohol, and heating the resultant mixture to effect reaction between the alcohol and any excess organic acid evolved in the reaction between the alkyl sulfate and the monocarboxylic acid salt.

14. The process of manufacturing organic esters, which comprises mixing an alkyl sulfate with about one fifth its volume of carbon tetrachloride, adding to the mixture an alkaline earth metal salt of an aliphatic monocarboxylic acid while maintaining the temperature of the mixture below about 122° F., gradually raising the temperature of the mixture and refluxing vapors of the mixture, and decanting the liquid portion from solids formed during the reaction.

OTTO SPRING.